Dec. 3, 1963    K. L. SCHULZE    3,113,102
TRICKLING FILTER
Filed July 15, 1960
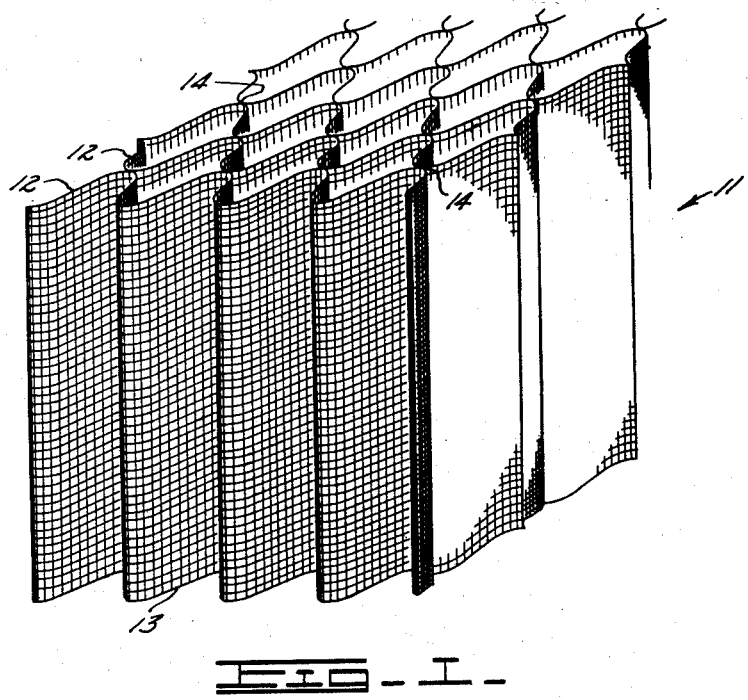
FIG-1-
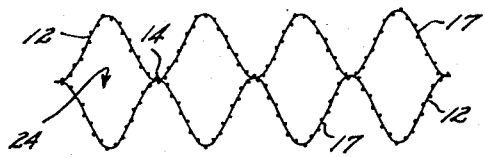
FIG-3-
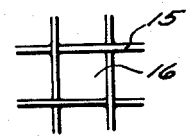
FIG-2-
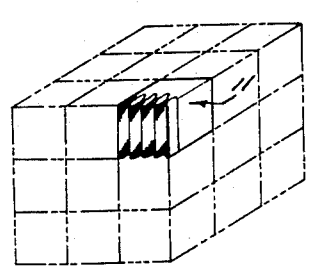
FIG-5-
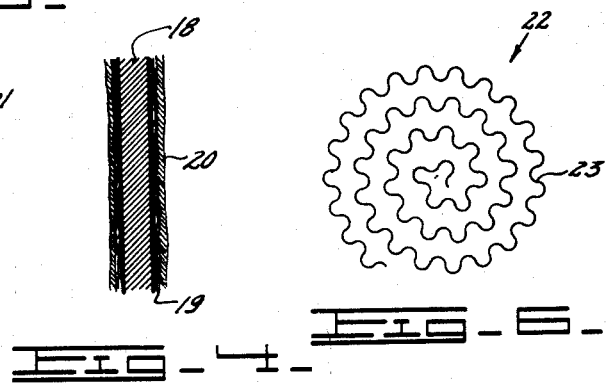
FIG-4-
FIG-6-
INVENTOR.
KARL L. SCHULZE
BY
ATTORNEYS

United States Patent Office 3,113,102
Patented Dec. 3, 1963

3,113,102
TRICKLING FILTER
Karl Ludwig Schulze, 148 Spartan Ave.,
East Lansing, Mich.
Filed July 15, 1960, Ser. No. 43,113
2 Claims. (Cl. 210—150)

The present invention relates to trickling filters and more particularly to a self supporting modular open-work filter for use in sewage treatment plants and the like. Still more particularly the present invention relates to large mesh screen panels joined in such a manner as to be free standing and load supporting while being light in weight and exposing a maximum surface for biological activity and remaining non-clogging.

Conventional trickling filters are beds of crushed rock over and through which water to be freed of bacterial oxygen demand or polluting matter is passed. The rock provides a support for growth of a bacterial film in relationship to its area. The difficulty with such filters is that the voids between rocks quickly become plugged or clogged and the efficiency of the filter accordingly drops. In place of the crush rock specially prepared vertically oriented tile or cermaic pieces have been arranged in geometric patterns in attempted avoidance of clogging and the like.

Such devices are known in the patent art as represented by Schulhoff in United States Letters Patent 2,188,162. To my knowledge none have gone materially beyond the ceramic teachings of Schulhoff and none have proposed a trickling filter wherein the filter media is simple open mesh screening.

Trickling filters must provide a base media for the growth and maintenance of slimes in which aerobic bacteria may operate upon the aqueous waste passing over the slime surface. The aerobic bacteria must be under aerobic conditions at the water film-slime interphase by a supply of dissolved oxygen from oxygen containing gas such as air and passing through the water film. The present invention, as will be seen, provides a very satisfactory support media and in addition provides an open void work which is completely non-clogging therefore assuring continuous interphase between aqueous organic waste material and air. As will be seen the efficiency of the present filter exceeds that of prior known trickling filters.

Accordingly one of the objects of the present invention is to provide a trickling filter media containing about 99.3 percent voids and wherein the voids are substantially non-clogging.

Another object is to provide a filter media of light weight and high strength against vertical loading or stacking.

Other objects include the development of simple stackable filter media cartridges amenable to modular installation and having a high capacity for example about 10 to 80 million gallons per acre per day at efficiencies of about 80 percent B.O.D. (bacterial oxygen demand) removal at the lower flow and about 58 percent B.O.D. removal at the higher flow without recycle. In standard type crushed rock trickling filters with hydraulic load at 4 million gallons per acre per day the efficiency of 85 percent B.O.D. removal is considered excellent. Simplicity is an obvious objective as well as overall economy including minimum foundation support for the light weight units in tiered or stacked relationship.

Still other objects include the provision of a mesh or screen type media which avoids clogging and which provides an ideal surface for the growth of microbial slimes and coatings.

In the drawings:

FIGURE 1 is a perspective view of a trickling filter media in module form prepared in accord with the present invention.

FIGURE 2 is an elevation view of a single mesh of the hardware cloth comprising the structure from which the filter of FIGURE 1 is formed.

FIGURE 3 is a plan view of the sinusoidally formed corrugations indicating how two formed elements are joined together.

FIGURE 4 is a schematic cross section taken through a single wire strand and indicating the support for the microbial mass.

FIGURE 5 is a perspective view of a plurality of trickling filter units in stacked relationship for insertion in a sewage purification plant or water treatment plant.

FIGURE 6 is a plan view of a modified structure in accord with the present invention and showing a spiral arrangement of the trickling filter structure.

DESCRIPTION

Referring to the drawings, FIGURE 1 illustrates a single unit 11 of the trickling filter of the present invention. The filter 11 comprises a plurality of sheets 12 formed in vertical corrugations 13 and jointed together at the contact junctures 14 between adjacent and oppositely oriented sheets 12. Juncture is accomplished by simple stapling, welding, or interweaving as is well known in the art. The material forming the sheets 12 is steel hardware cloth and which may be coated as by known galvanizing processes or the selection of corrosion resistant materials. In some instances the preparation of plastic or resin grids in sheet form may be satisfactory. As will be appreciated by reference to FIGURE 2, the hardware cloth should be provided with open-work mesh 15 so as to provide in excess of 90 percent voids 16. The sheets 12 when formed into a 1 foot by 1 foot by 3 foot unit of filter 11 should resist between 1200 and 1300 or better pounds per square foot under vertical loading. Very good results are obtained using 19 gauge hardware cloth in ½ inch mesh, galvanized.

As best illustrated in the plan view of FIGURE 3 sinusoidal corrugations 17 are prepared for providing a vertical pattern of hardware cloth most resistant to clogging by the avoidance of tight corners as may be found in zig-zag corrugation or other convolutions. This is not intended to restrict the invention to the specific sinusoidal form but simply indicates that the sinusoidal form is preferred over simple zig-zag corrugations in providing a minimum amount of entrapment areas or corners which may cause the media to plug or clog.

With reference to FIGURE 4 the mechanism of the trickling filter is best described. A single strand or wire 18 is illustrated and which may be considered as one of the vertical strands in the filter 11. To either side and surrounding the wire 18 is a biological film 19 which cumulates in use and provides the supporting bed for aerobic micro organisms. Liquid waste 20 is trickled continuously over the biological film 19 so as to provide an interphase of liquid to organic culture. This microbial bed is an organic mass receiving organic waste material or pollutant for aerobic destruction. Equally important is the air to liquid interphase providing an exchange of carbon dioxide and oxygen. The carbon dioxide is the gaseous product of aerobic bacterial activity. The oxygen is essential in maintaining the biological film in an aerobic condition. As will be appreciated as a consequence of physical analysis of the open work structure, very little opportunity is provided for the development of anaerobic conditions. The clogging as between plural pieces of support media is substantially completely avoided.

As will be appreciated the smooth interphase between support media in the present invention and rock, for example, facilitates the sloughing off of accumulated biological growth, usually prior to the development of anaerobic conditions at the media to film interphase. Further, by reason of the tubular vertical openings 24 as between adjacent convolutions as shown in FIGURE 3 sloughing is allowed to occur without interference from the support surfaces and the openings 24 allow free passage of air during build up of microbial film 19.

In FIGURE 5 a characteristic stacked or tiered arrangement is illustrated as would be utilized in a trickling filter installation. The filter 21 is made up of a plurality of filter units 11. The limits of horizontal extension are infinite while the vertical stacking is a matter determined by the inherent rigidity and resistance to crusing built into the presently described unit with stability achieved by the corrugated form and vertical orientation. Of collateral economic importance the light weight of the present filters in tiered relationship avoids the necessity for foundation or support structures of great strength. When using the structure of FIGURE 1 as described with 19 gauge stock the weight is about 3 pounds per cubic foot.

FIGURE 6 shows a cylindrical modification of a filter media unit 22 while employing corrugations in a single sheet and wound 23 in spiral form. This device has all of the structural features present in unit 11 and additionally avoids the requirements of fastening. It will be appreciated that successive rings or convolutions of the sheet comprising unit 22 are in spaced apart relation from each other.

In performance filter media structures in accord with the present invention provide 8 times the flow capacity of former rock filters. The advantages on a comparative basis can be appreciated by reference to the following Tables I and II.

*Table I*

| Flow in Millions of Gallons per acre/day | Percent efficiency in B.O.D removal | | Rock High-Rate Recycle |
| --- | --- | --- | --- |
| | Described Devices | Rock Filter Standard | |
| 4 | 85.5 | 85 | 80. |
| 10.3 | 80.1 | beyond capacity | 75. |
| 30.8 | 78.3 | ----do---- | 70. |
| 60.0 | 70.6 | ----do---- | beyond capacity. |
| 80.0 | 58.9 | ----do---- | Do. |

*Table II*

| Type of Filter | Weight in lb./cubic foot | Surface Area, square feet /cubic feet | Percent Voids |
| --- | --- | --- | --- |
| Rock or Gravel | 90.5 | 30 | 45 percent diminishes in use. |
| Screen Device | 3.0 | 20 | 99.3 percent relatively constant. |

The use of a screen form of filter media in accord with the present invention provides a continuous interrupted flow in delay of free flow as the waste laden aqueous material courses down the lattice-like form. This results in an extended time contact period with the biological film while allowing transverse as well as vertical air passage through the voids.

Having thus described my invention and specific embodiments thereof various adaptations and modifications of my invention will occur to those skilled in the art and such modifications are intended to be included herein limited only by the scope of the hereinafter appended claims.

I claim:
1. In a trickling filter for supporting a biological culture in an aerobic process for destruction of organic materials dispersed in an aqueous flow and wherein the flow is vertical form top to bottom, the combination comprising:
   (a) a plurality of open work grid screens, the transverse openings therethrough each being in vertical plane relationship and said grid members defining said openings providing guide flow surfaces and said transverse openings thus defined, being substantially larger than any dispersed solids in said aqueous flow;
   (b) adjacent of said grid screens being vertically corrugated to resist vertical axial stresses in excess of the weight of said grid screens, biological growth thereon, and aqueous flow down said surfaces, and adjacent peaks of said corrugations being joined in vertical contact seams thereby defining columnar vertical voids of a size substantially in excess of the size of any dispersed solids in said aqueous flow; and
   (c) a plurality of said grid screens thus formed grouped and secured in a unit filling a spatial volume and a plurality of said units being stacked so that all of said columnar voids in each of said units are in parallel vertical relation.

2. A modular trickling filter structure providing a lightweight media for support of biological growth and wherein an aqueous influent carrying dispersed organic material is introduced for downward trickling, the combination comprising:
   (a) a plurality of open-work grid screens wherein all transverse openings therethrough are in vertical plane relationship and said grid members defining said openings providing guide flow surfaces, and said transverse openings, thus defined, being substantially larger than any dispersed solids in said aqueous flow, and said grid screen being vertically corrugated to resist vertical axial stresses applied to said grid screen in excess of the weight of said grid screen, biological growth thereon, and aqueous flow down said surfaces;
   (b) unit modules prepared by joining a plurality of said grid screens in adjacent parallel relationships along vertical contacting edges whereby vertical columnar voids are presented;
   (c) and a stack of said unit modules, thus prepared, in vertical tiered relationship in accord with desired volume and flow, said modules resisting crushing by reason of their corrugated form and adjacent joined relationship while providing grid media on which said biological growth can proceed.

References Cited in the file of this patent

UNITED STATES PATENTS

| 2,188,162 | Schulhoff | Jan. 23, 1940 |
| 2,334,263 | Hartwell | Nov. 16, 1943 |
| 2,354,931 | Tolman | Aug. 1, 1944 |
| 2,651,414 | Lawson | Sept. 8, 1953 |

FOREIGN PATENTS

| 534,385 | Great Britain | Mar. 5, 1941 |
| 770,202 | Great Britain | Mar. 20, 1957 |